(12) United States Patent
Chow et al.

(10) Patent No.: US 12,468,742 B2
(45) Date of Patent: Nov. 11, 2025

(54) TEXT-TRIGGERED DATABASE AND API ACTIONS

(71) Applicant: Oracle International Corporation, Redwood Shores, CA (US)

(72) Inventors: Qian Rui Chow, Vancouver (CA); Donald Creig Humes, Yorktown, VA (US); Kaarthik Balasubrahmanian, Belmont, CA (US); Sridhar Tadepalli, Bangalore (IN); Saravanan Anandan, Fremont, CA (US); Kartik Raghavan, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 262 days.

(21) Appl. No.: 18/168,358

(22) Filed: Feb. 13, 2023

(65) Prior Publication Data

US 2024/0012837 A1    Jan. 11, 2024

Related U.S. Application Data

(60) Provisional application No. 63/358,789, filed on Jul. 6, 2022.

(51) Int. Cl.
| | |
|---|---|
| *G06F 16/31* | (2019.01) |
| *G06F 16/383* | (2019.01) |
| *G06F 40/30* | (2020.01) |
| *G06N 20/00* | (2019.01) |

(52) U.S. Cl.
CPC .......... *G06F 16/313* (2019.01); *G06F 16/383* (2019.01); *G06F 40/30* (2020.01); *G06N 20/00* (2019.01)

(58) Field of Classification Search
CPC .... G06F 16/235; G06F 16/313; G06F 16/383; G06F 16/24522; G06F 9/54; G06F 9/541; G06F 9/547; G06F 10/30; G06F 40/279
USPC ................................ 707/711, 804; 717/719
See application file for complete search history.

(56) References Cited

U.S. PATENT DOCUMENTS

| | | | |
|---|---|---|---|
| 10,775,976 B1* | 9/2020 | Abdul-Jawad | G06F 16/245 |
| 2002/0016787 A1* | 2/2002 | Kanno | G06F 16/30 |
| | | | 707/999.005 |
| 2014/0108496 A1* | 4/2014 | Heller | G06F 16/954 |
| | | | 709/203 |
| 2016/0342681 A1* | 11/2016 | Kesin | G06F 16/40 |
| 2019/0363959 A1* | 11/2019 | Rice | G06F 16/9035 |

* cited by examiner

*Primary Examiner* — Shahid A Alam
(74) *Attorney, Agent, or Firm* — Invoke

(57) ABSTRACT

Techniques for initiating system actions based on text content are disclosed. A system applies a semantic analysis model at run-time to human-understandable text to identify actionable content within the human-understandable text. The system analyzes metadata associated with the text to identify a mapping between one or more data objects associated and the semantic content in the text. The system identifies one or more contact lists associated, respectively, with the one or more data objects. Using a database schema, the system analyzes the contact lists to determine whether to modify the contact lists.

19 Claims, 6 Drawing Sheets

TEXT-TRIGGERED DATABASE AND API ACTIONS

INCORPORATION BY REFERENCE; DISCLAIMER

The following application is hereby incorporated by reference: application No. 63/358,789, filed Jul. 6, 2022. The applicant hereby rescinds any disclaimer of claims scope in the parent application(s) or the prosecution history thereof and advise the USPTO that the claims in the application may be broader that any claim in the parent application(s).

TECHNICAL FIELD

The present disclosure relates to text-triggered database and application programing interface (API) actions. In particular, the present disclosure relates to analyzing human-understandable text to identifying action-triggering data in the text.

BACKGROUND

Enterprises utilize wide varieties of platforms and applications to record data and act on the recorded data. One application may provide a mobile interface to allow a user to record brief notes about client meetings. Another application may provide a browser-based interface to record contact information. Another application may allow for scheduling of tasks and meetings. Various applications may have various levels of integration. For example, an application that records contact information may synchronize with an application that generates email. An application that allows an agent to record notes with a client may synchronize with a cloud-based platform to allow all recorded notes to be accessed across many different devices. However, the note-recording application may not be synchronized with any other type of application, such as a contact list application, a calendar application, or an email-generating application. Consequently, when a user creates a record, such as a client meeting, which includes actionable information, the user typically must open a file including text content and then navigate one or more external applications to perform or schedule an action described in the text content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
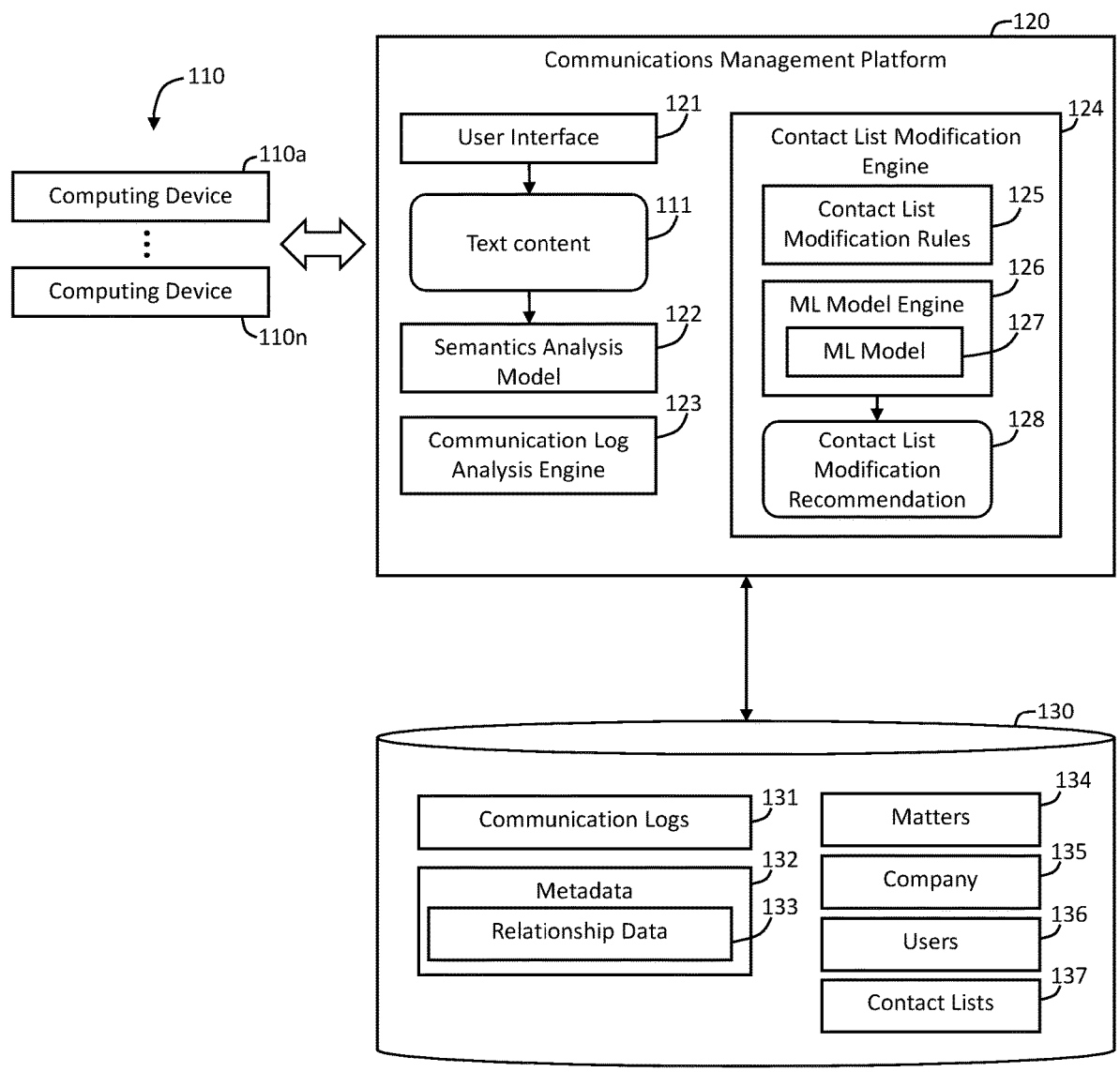
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. INITIATING SYSTEM ACTIONS BASED ON TEXT CONTENT
4. TRAINING A MACHINE LEARNING MODEL
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

Enterprises maintain vast quantities of human-understandable text which may contain actionable content. For example, an enterprise may maintain data on many different matters associated with a single client. The enterprise may also maintain similar data for many different clients. For example, an agent associated with a particular matter may generate a series of text logs describing interactions with different individuals at a client company. The text logs may include content associated with potential future actions, such as names, job titles, and phone numbers that may be used to generate and/or modify contact lists. In addition, the text logs may include words and phrases associated with generating appointments and reminders and running queries on a database.

One or more embodiments apply a semantic analysis model at run-time to human-understandable text to identify actionable content within the human-understandable text. The system analyzes metadata associated with the text to identify a mapping between one or more data objects associated and the semantic content in the text. The system identifies one or more contact lists associated, respectively, with the one or more data objects. Using a database schema, the system analyzes the contact lists to determine whether to modify the contact lists.

For example, the system may identify a name and a phone number in a conversation log generated by an agent. The system analyzes metadata associated with the conversation log to identify data objects associated with: (a) a matter associated with the conversation log, (b) a company associated with the matter, and (c) the agent. The system identifies contact lists associated with the respective data objects. The system applies a set of contact list modification rules to determine whether to modify one or more of the contact lists based on the identified name and phone number. For example, the system may sequentially analyze (a) a first contact list associated with the matter-type data object, (b) a second contact list associated with the company-type data object, and (c) a third contact list associated with the agent-type data object. The system may apply a rule that directs the system to create a new contact in the first contact list based on determining that a name is not found in any of the contact lists (a)-(c). In addition, or in the alternative, the system may apply a rule that directs the system to create a new contact in both the first and second contact lists based on determining that a name is not found in any of the contact lists (a)-(c).

According to another example embodiment, the system may determine that one of the contact lists (a)-(c) includes a contact name but not the identified phone number in the text content. The system may apply a rule that directs the system to modify an existing contact in the first contact list to include the identified phone number based on determining that (1) the first contact list includes the name, and (2) the entry associated with the name does not include the identified phone number.

One or more embodiments initiate an application programming interface (API) command based on an action identified in semantic content associated with a set of human-understandable text. For example, the system may identify terms "meet" "with" "Rita" "Thursday" in a set of text. The system analyzes metadata associated with the text to identify a data object associated with the text. The data object specifies a set of API commands, including an appointment-generating API command for a calendar-type application. The system identifies the semantic content associated with the terms in the text as corresponding to the appointment-scheduling type API command. The system executes the appointment-scheduling type of API command to generate an appointment on Thursday with a contact named Rita. The system may display the appointment to a user associated with the set of text. The system may prompt the user to complete the appointment by providing a time, place, and potential alternative date for the appointment.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes user devices 110, a communications management platform 120, and a data repository 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Users perform communication operations via the computing devices 110. The computing devices 110 communicate with the communications management platform 120 to perform and/or record communications. For example, the communications management platform 120 may be implemented, in part, as an application stored on a computing device 110a. A user may access the application to (a) access contact information of entities—such as individuals and organizations—stored and maintained by the communications management platform 120, and (b) access matter information of matters (such as sales opportunities, ongoing company projects, etc.) maintained by the communications management platform 120, and (c) modify contact and/or matter data stored by the communications management platform 120. As another example, the communications management platform 120 may be a cloud-based application, such as a software-as-a-service (SaaS) application, stored in a cloud environment and accessible by various users in an organization via a network. According to yet another example, the communications management platform 120 includes elements stored on devices 110 and other elements stored in a cloud environment.

In an embodiment, computing devices 110 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a television, a content receiver, a set-top box, a printer, a mobile handset, a smartphone, a personal digital assistant ("PDA"), a communication management device, and/or a client device. In an embodiment, the communications management platform 120 is also implemented on one or more digital devices. For example, some or all of the communications management platform 120 may be stored in a server accessible via a network. Alternatively, a portion of the communications management platform 120—such as a user interface 121—may be implemented as an executable application stored on a computing device 110a, and another portion—such as a machine learning model 127 for generating contact list modification recommendations 128—may be stored on a server in a cloud environment accessible by the computing device 110a.

A user interacts with a user interface 121 to access and/or modify data object content maintained by the communications management platform 120. For example, a user may identify employees and clients associated with particular matters 134. As another example, a user may access stored contact lists 137 to obtain communication information for employees and/or clients. In one or more embodiments, a user interface 121 refers to hardware and/or software configured to facilitate communications between a user and the communications management platform 120. Interface 121 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 121 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 121 is specified in one or more other languages, such as Java, C, or C++.

A user generates a communication via a computing device 110. A user may generate a communication device as text, such as an instant message, a text message, or an email. Alternatively, a user may generate a message via another medium, and the computing device 110 may convert the message to text. For example, a user may conduct a conversation via a video conferencing application. The video conferencing application may convert speech captured in the video into a text transcript of the conversation. Similarly, an application may record telephone conversations or audio conversations conducted via a particular application that generates conversation transcripts. According to one example embodiment, the communications management platform 120 includes functionality to generate text content. The communications management platform 120 may include functionality to (a) send text messages to contacts on one or more contact lists 137, and (b) generate text notes associated with a particular matter 134.

The communications management platform 120 includes a semantics analysis model 122. The semantics analysis model 122 analyzes text content in a set of text to identify parts of speech and contact information. The semantics analysis model 122 identifies, for example, proper names, telephone numbers, addresses, and job titles.

The semantics analysis model 122 may include any machine learning model capable of identifying and/or classifying words, numbers, and symbols within a set of text as being contact information (e.g., proper names, telephone numbers, addresses, and job titles). Some examples of semantic analysis models for analyzing text content include a standard latent semantic analysis model and a probabilistic latent semantic analysis model generated based on an expectation-maximization (EM) algorithm. An EM algorithm is implemented as an iterative method to find maximum likelihood or maximum a posteriori (MAP) estimates of parameters.

In some examples, one or more elements of the semantics analysis model 122 use a machine learning algorithm to classify text content, for example, as a part-of-speech and as contact information. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, a set of training data includes datasets and associated labels. The datasets are associated with input variables (e.g., sets of text content) for the target model f. The associated labels are associated with the output variable (e.g., types of contact information, parts of speech) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data. In an embodiment, a machine learning algorithm can be iterated to learn which types of content correspond to contact information.

The communication log analysis engine 123 analyzes metadata 132 associated with text content in the communication log 131 stored in the data repository 130. The communication log analysis engine 123 identifies, in the metadata 132, relationship data 133 specifying a relationship between (a) text content and (b) a first data object of a first object type. For example, the first object type may be a "matter" object type 134. A plurality of matter-type objects 134 may be stored in the data repository 130. The communication log analysis engine 123 further identifies a relationship between the first data object and a target contact list among a set of contact lists 137. For example, the communication log analysis engine 123 may analyze a database schema associated with a database including the contact lists 137 to identify the target contact list among the contact lists 137. The set of contact lists 137 may include, for example, one contact list associated with a particular user, another contact list associated with multiple different users associated with a same matter, and another contact list maintained by a company, accessible by many different users corresponding to many different matters. Each contact list may have a respective access level. A contact list maintained by a particular user may not be accessible by any other user in the same company. A contact list associated with a matter may be accessible by any users associated with the matter. The contact list may be inaccessible by users who are not associated with the matter. A contact list associated with a company may be accessible by any users within the company. Identifying, by the communication log analysis engine 123, the target contact list may include determining which contact list—and which associated access level—among multiple different contact lists and access levels should be associated with a particular set of contact information.

A contact list modification engine 124 determines whether the target contact list includes the contact information identified by the semantics analysis model 122. For example, the contact list modification engine 124 may determine whether the target contact list includes an entry with a name, a job title, or a phone number identified in a set of text. The contact list modification engine 124 may further determine whether a target contact list 137 includes entries with particular groupings of contact information. For example, a set of text may include two instances of the proper name "John." One instance may be associated with a phone number. Another may be associated with a job title. The contact list modification engine 124 may determine whether a target contact list 137 includes (a) an entry including the name "John" and the phone number, and (b) an entry including the name "John" and a job title. The semantics analysis model 122 may determine whether separate instances of contact information correspond to the same contact. Accordingly, based on the categorization applied by the semantics analysis model 122 to the contact information in the text, the contact list modification engine 124 may search for two separate entries associated with the proper name "John" or with one entry, including both the identified phone number and the identified job title.

Based on determining that the target contact list does not include the contact information identified by the semantics analysis model 122, the contact list modification engine 124 applies a set of rules 125 to determine whether to modify the target contact list to include the contact information. One rule may specify that (a) if the target contact list does not include an entry including (b) a name (c) generated by a particular user, then the contact list modification engine 124 should generate in the target contact list a new entry with the specified. The rule may further specify that if the same text includes a phone number determined to be associated with the name, the contact list modification engine 124 should populate a "phone" field of the contact list entry with the identified phone number.

In addition, or in the alternative, the rules 125 may specify operations to analyze one or more additional contact lists prior to determining whether to modify the target contact list.

According to one embodiment, the semantics analysis model 122 identifies a matter 134 (represented by a particular identification number or name for the matter) associated with identified contact information. The contact list modification rules 125 may include a rule 125 which directs the contact list modification engine 124 to identify a second data object associated with the identified matter 134. The second data object may have a particular relationship with the first data object. For example, each data object of the second data object type may be associated with one or more data objects of the first data object type. In contrast, each data object of the first data object type may be associated with only one (and may not be capable of being associated with more than one) object of the second data object type. As a particular example, a matter-type (134) data object may be associated with only one company-type (135) data object. However, a company-type (135) data object may be associated with many different matter-type (134) data objects. The matter-type (134) data objects may correspond to company operations, such as: (a) a number of sales opportunities being pursued, or which have been pursued, by employees of the company, and (b) an ongoing project—such as a manufacturing, sales, cloud-service providing, software onboarding—maintained by the company.

The contact list modification engine 124 determines whether the second contact list includes the contact information. For example, the contact list modification engine 124 may determine whether the second contact list includes an entry with a name identified by the semantics analysis model in the text content. In addition, or in the alternative, the contact list modification engine 124 may determine whether the second contact list includes any entry with a phone number, job title, or any combination of two or more contact attributes (e.g., name, phone number, address, job title).

Based on determining that the second contact list does not include the contact information, the contact list modification engine 124 applies the set of rules 125 to determine whether to modify one or both of the target contact list and the second contact list to include the contact information. One rule may specify that (a) if neither the target contact list nor the second contact list includes an entry including contact information identified in the text content, then the contact list modification engine 124 should generate in the target contact list a new entry with the specified contact information. The rule may further direct the contact list modification engine 124 to generate a new entry with the specified contact information in the second contact list.

In addition, or in the alternative, the rules 125 may specify operations to analyze one or more additional contact lists prior to determining whether to modify the target contact list and/or the second contact list.

According to one example embodiment, a rule 125 directs the contact list modification engine 124 to identify a third data object associated with a particular user and matter. For example, a particular user may access the communications management platform 120 to generate text content 111 in a "notes" section of a user interface associated with a particular matter 134. The set of rules 125 directs the contact list modification engine 124 to identify a third contact list, among the contact lists 137, associated with the particular user. The data object storing contact information for the third contact list may be independent of the first and second data objects. In one example embodiment, the third contact list is a "Quick Contacts" list of the most frequently-accessed contacts of the particular user generating the text content 111.

Based on determining that the third contact list does not include the contact information, the contact list modification engine 124 applies the set of rules 125 to determine whether to modify one or both of the target contact list and the second contact list to include the contact information. One rule may specify that (a) if none of the target contact list, the second contact list, and the third contact list includes an entry including a name identified in the text content 111, then the contact list modification engine 124 should generate in the target contact list a new entry with the contact information. The rule may further direct the contact list modification engine 124 to generate a new entry with the contact information in the second contact list.

In one or more embodiments, the communications management platform 120 performs the semantic analysis and analyzes and/or modifies one or more data objects representing contact lists at run-time, as a user is entering text content 111. For example, a user may enter, via a user interface 121, text content including contact information. The user may continue entering text content 111 as the communications management platform (a) performs a semantic analysis of the text content, (b) identifies the contact information, and (c) applies modification rules 125 to modify data objects storing information associated with multiple contact lists. According to one or more embodiments, the contact list modification engine 124 applies a set of rules to determine whether to modify one or more contact lists, from among multiple different contact lists. The multiple different contact lists have different user-access attributes. One contact list may be a list maintained by a single user. The list may not be accessible to other users. Another contact list may be a list accessible by multiple different users associated with a same matter. The list may not be accessible to other users who are not associated with the matter. Yet another list may be a global contact list accessible to any users within a company. Each lists may store separate sets of contacts. Some contacts may overlap between two or more lists. Some contacts may include some information—such as a contact name and phone number—that overlaps among multiple lists. The same contacts may include other information—such as a cell phone number and private email—that may be located on one list and not on another list. The contact list modification engine 124 may apply rules 125 to automatically determine, without user intervention, whether to include particular contact information on one list while excluding it from another list.

According to one or more embodiments, the contact list modification engine 124 includes a machine learning model engine 126. In some examples, one or more elements of the machine learning model engine 126 may use a machine learning algorithm to generate recommendations for modifying contact list—type data objects with contact information identified in text content 111. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, a set of training data includes datasets and associated labels. The datasets are associated with input variables (e.g., text content including contact information, user information of a user generating the text content, matter information associated with the text content) for the target model f. The associated labels are associated with the output variable (e.g., whether to modify a contact list data object, which contact list data object to modify, what information among the identified contact information should be added to which contact list data object) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

In an embodiment, a machine learning algorithm can be iterated to learn when to recommend modifications to contact list-type data objects, which contact-list-type data objects to modify, and which contact information, among a set of identified contact information, should be used to modify which contact list-type data object. In an embodiment, a set of training data includes historical text content including contact information within the text content, and information identifying different contact-list-type data objects. The contact information is associated with labels, indicating (a) whether to include the contact information in one or more contact-list-type data objects, (b) which contact-list-type data objects to modify with the contact information, and (c) which contact information, in a set of contact information, should be added to which contact-list-type data object. According to one or more embodiments, the contact list modification engine 124 implements the machine learning model 127, instead of the set of rules 125, to determine when to modify contact-list-type data objects. According to another embodiment, the machine learning model engine 126 uses the rules 125 to train, or to re-train, the machine learning model 127.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the communications management platform 120 and/or the computing devices 110a-110n. Alternatively, or additionally, a data repository 130 may be implemented or executed on a computing system separate from the communications management platform 120 and/or the computing devices 110a-110n. A data repository 130 may be communicatively coupled to the communications management platform 120 and/or the computing devices 110a-110n via a direct connection or via a network.

Information describing communication logs 131, metadata 132, data objects 134-136, and contact lists 137 may be implemented across any of components within the system 100. However, this information is illustrated within the data repository 130 for purposes of clarity and explanation.

In one or more embodiments, a communications management platform 120 refers to hardware and/or software configured to perform operations described herein for analyzing text content and triggering one or more system actions to modify one or more contact-list-type data objects based on the text content. Examples of operations for managing modifications to contact-list-type data objects based on text content are described below with reference to FIG. 2.

In an embodiment, the communications management platform 120 is implemented on one or more digital devices. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Additional embodiments and/or examples relating to computer networks are described below in Section 6, titled "Computer Networks and Cloud Networks."

3. Initiating System Actions Based on Text Content

Figure 2A:
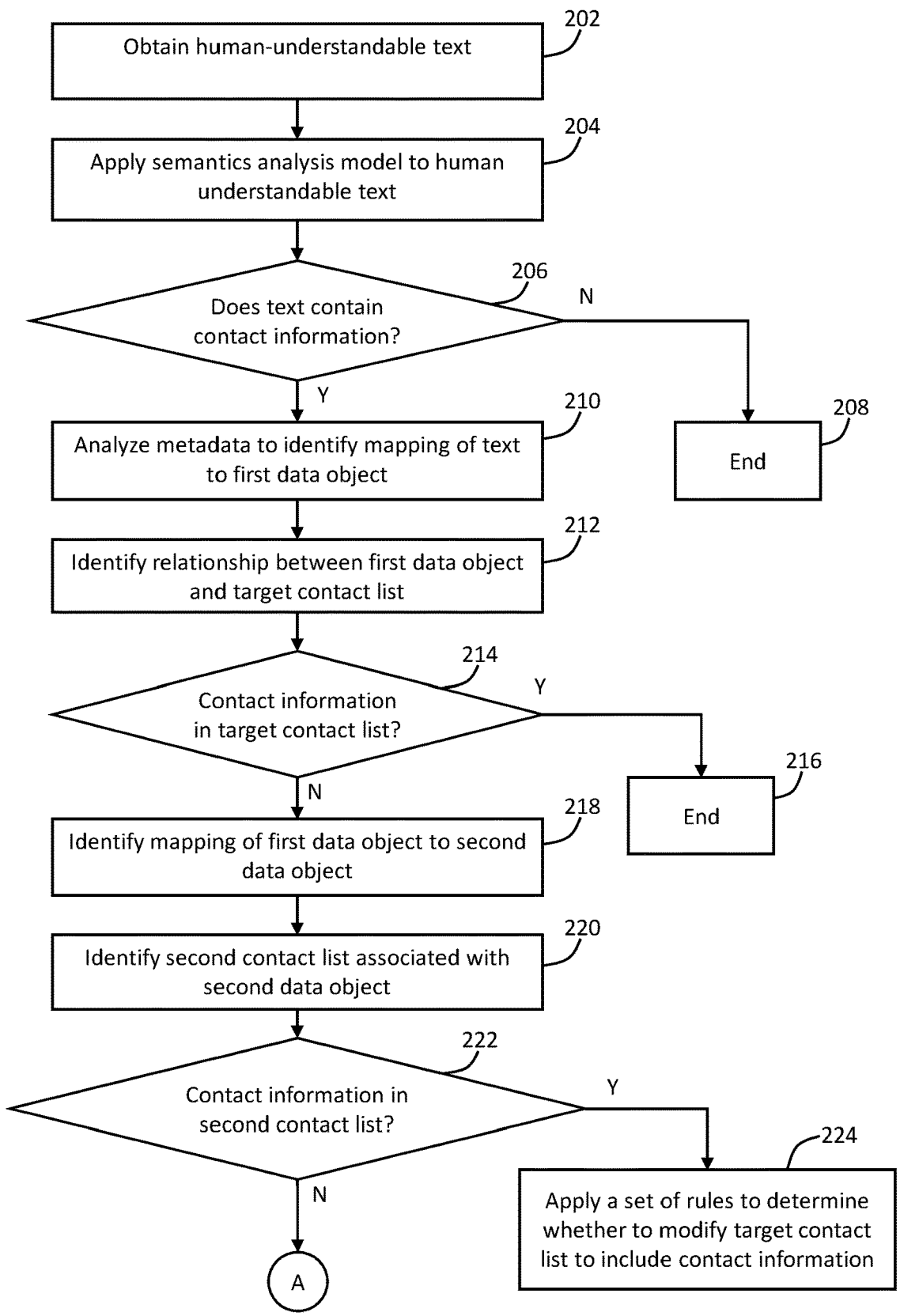
FIGS. 2A and 2B illustrate an example set of operations for initiating system actions based on text content in accordance with one or more embodiments.
Figure 2B:
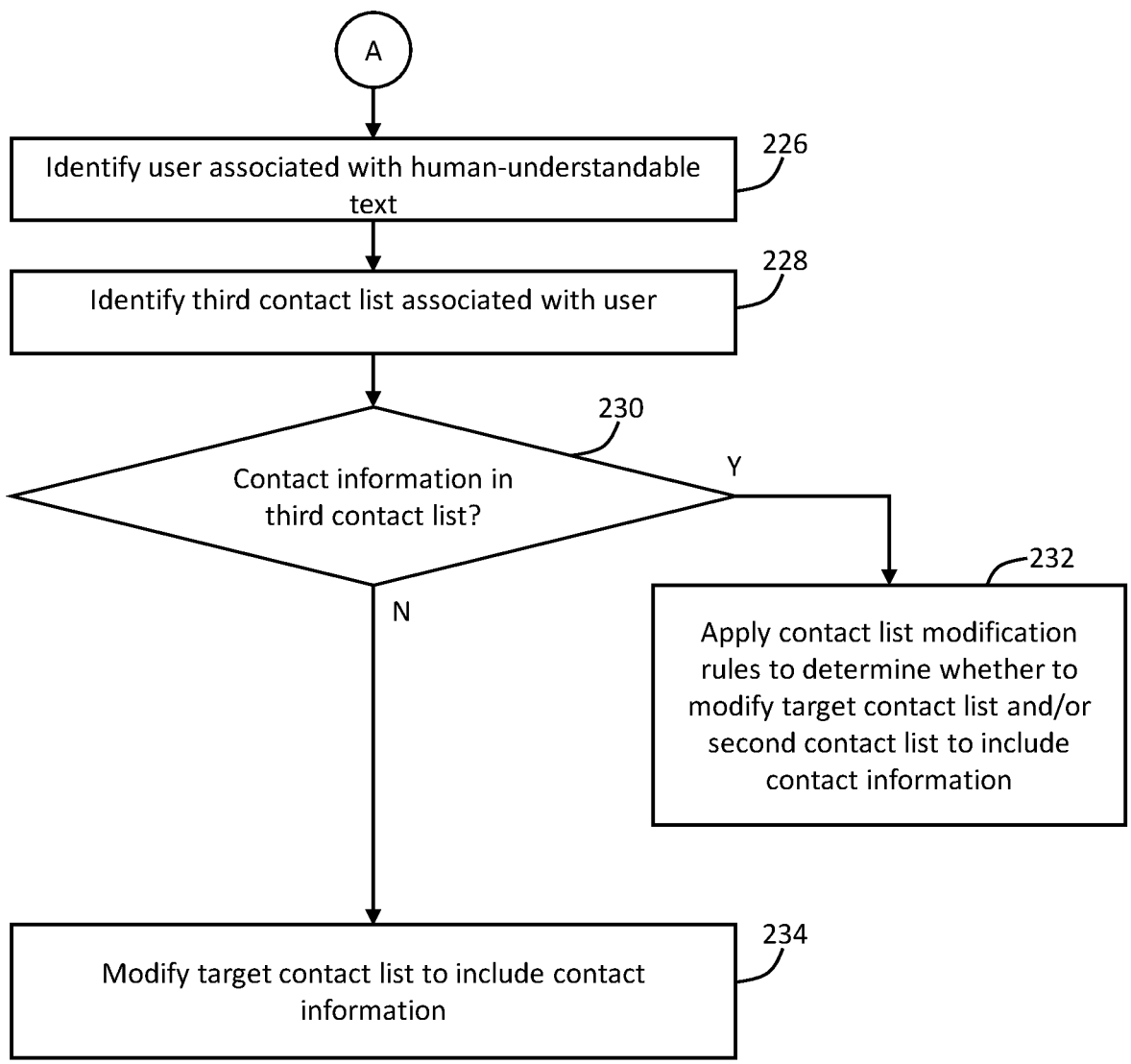

FIG. 2 illustrates an example set of operations for initiating system actions based on text content in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system obtains a set of human-understandable text (Operation 202). The text may be in a word processor, a web browser, or any other application. The text may be stored electronically in ASCII format, rich text formats (RTF), as HTML, or in any other format. For example, a user may type text into a field of an application that records notes on a mobile device. The text may be stored in a data repository accessible via a cloud-based data storage. In addition, or in the alternative, a user may enter data into a field of a calendar application, an electronic communications application (such as email, cloud-based instant message, or cellular phone-based text message), a word processing application, or a portable document format (PDF)-type document. For example, a user may generate a comment window in a PDF document at a particular location in the document. The comment window may be associated with a particular location in the document and may include text such as "see Harris to get more information about this topic."

According to one example, a user may enter text into a note-taking application. The note-taking application may store user-generated notes according to matter names. For example, the user may be a salesperson. The salesperson may store communications associated with a same prospective sales opportunity in the same matter category: "ABC Co." One communication may be: "I talked with Saul today. He asked me to call Mark (555-123-4567) to present the info about Product Y." Another communication may be: "Met with the team today. Presented info. about [Product Y]. Janice could not make it. Janice has availability next week—Wed and Thurs. Follow up to present info."

As another example, the user may be a product developer. The user may store communications associated with the same product in the same matter category: "Product DEF." One communication may be: "Met with the team today to discuss bugs. Call Pat tomorrow to discuss progress." Another communication may be: "Client requested modification to platform to include cloud functionality for Application B. Need to discuss with @Chris ASAP"

The system applies a semantics analysis engine to the human-understandable text (Operation 204). The semantics analysis engine analyzes the text to identify semantic components. For example, the semantics analysis engine may identify: separate sentences, separate phrases, parts of speech (such as subjects, predicates, objects, verbs, nouns), proper names of individuals, company names, phone numbers, addresses, email addresses, social media tags, and job titles. The semantics analysis engine may classify certain identified components of the text as "contact information." For example, the semantics analysis engine may classify proper names of individuals, company names, phone numbers, addresses, email addresses, social media tags, and job titles. In addition, the system may derive contact information from text content. For example, the semantics analysis engine may identify an email address: j.ruiz@abcco.xxx. The system may derive a contact name, J. Ruiz, from the email address.

Referring to the example above in which a salesperson enters text into a note-taking application, the system may identify "Saul," "Mark," and "Janice" as names of individuals. The system may identify (555-123-4567) as a phone number. Referring to the example above in which the user is a product developer, the system may identify "Pat" as a name of an individual. The system may identify @Chris as a social media handle.

The system determines whether the human-understandable text contains contact information (Operation 206). For example, the system may search the semantic data generated by the semantics analysis engine to identify names of individuals in the human-understandable text. In addition, or in the alternative, the system may search the semantic data generated by the semantics analysis engine to identify other contact information, such as a company name, a phone number, an email address, a social media handle, a physical location address, and a job title.

If the system determines that the human-understandable text does not include contact information, the system terminates the process of determining whether to perform a text-triggered action (Operation 208).

If the system determines that the human-understandable text includes contact information, the system analyzes metadata associated with the human-understandable text to identify a mapping of the text to a first data object (Operation 210). According to one or more embodiments, the system identifies the data object associated with human-understandable text at run-time by analyzing metadata associated with the human-understandable text. According to one or more embodiments, the identifying the mapping of the text to the first data object includes analyzing a database schema of the first data object.

Referring to the example above in which a salesperson enters text into a note-taking application, the system may analyze metadata associated with the salesperson-generated note-taking file to identify a data object named "ABC Co. Pitch 10" of a data object type "Sales Opportunity" associated with the human-understandable text. For example, the salesperson may interact with a user interface to select "ABC Co. Pitch 10" as a "matter name" in the note-taking application. The salesperson may record human-understandable text in the note-taking application. The system may store data identifying the ABC Co. Pitch 10 data object as metadata associated with the note-taking file generated by the salesperson.

The data object "ABC Co. Pitch 10" may include records for each human-understandable text record generated by a user and categorized with a category "ABC Co. Pitch 10." For example, a salesperson may record an initial contact to one individual at ABC Co. and a series of three additional meetings with additional individuals associated with the sales opportunity at ABC Co. The data object named "ABC Co. Pitch 10" may include at least four entries associated with the four different contacts or meetings with individuals regarding the ABC Co. Pitch.

The system identifies a relationship between the first data object and a target contact list (Operation 212). The target contact list includes a set of contact entries. Each contact entry includes a contact name (and/or title) and information to initiate communications with the contact, such as a phone number, a physical address, and an email address. According to one embodiment, the data object includes a field that contains a link to the target contact list. For example, the field may be entitled "Contact List" and the link to the target contact list may be a uniform resource locator (URL) to a file that includes the contact list.

The system analyzes data in the contact list to determine whether the contact information identified in the human-understandable text is contained in the target contact list (Operation 214). For example, the system analyze the names of the entries in the contact list to determine whether the contact list includes text from the human-understandable text that has been identified as a name by the semantics analysis engine. In addition, or in the alternative, the system may analyze fields associated with names of entries in the contact list to determine whether the entries include additional contact information, such as: a job title of a contact, a phone number of a contact, an email address of a contact, a social media handle of a contact, a physical address of a contact, and a department of a contact.

For example, the system may identify in the human-understandable text "Phil" as a name and "Phil@abcco.xxx" as an email address. The system may analyze the target contact list to determine whether (a) the target contact list includes an entry for Phil, and (b) if so, if the entry for Phil includes the email address "Phil@abcco.xxx."

According to one or more embodiments, the system applies multiple data points from the semantic data generated based on the human-understandable text to determine whether the contact list includes contact information. For example, the human-understandable text may include the content " . . . Pavel in accounting . . . " and the phone number (555-122-3456). The system may identify two separate contacts named "Pavel" in the contact list. The system may further analyze the contacts to determine whether one of the contacts includes the term "accounting" in a field named "department." Based on determining that one of the contacts includes the term "accounting" in the field "department," the system may identify the particular contact as being associated with the name "Pavel" in the human-understandable text. The system may determine that the other contact named "Pavel" in the target contact list is not associated with the name "Pavel" in the human-understandable text.

If the system determines that the target contact list includes the contact information identified in the human-understandable text, the system ends the process of determining whether to update the target contact list (Operation 216). For example, if the system identifies a name "Ruiz" in the human-understandable text and the system determines that the target contact list includes an entry including the name "Ruiz," then the system may determine that the target contact list should not be modified to include another contact named "Ruiz." Similarly, if the system identifies a phone number (555-122-3456) in the human-understandable text and the system determines that the target contact list includes an entry with a field including the value (555-122-3456), then the system may determine that the target contact list should not be modified to add the phone number to any entry in the target contact list.

If the system determines that the target contact list does not include the contact information identified in the human-understandable text, the system identifies a relationship between the first data object and a second data object (Operation 218). The first data object is of a first type and the second data object is of a second type. According to one embodiment, the first data object has a one-to-one relationship with data objects of the second type. For example, the first data object may be of a type "Sales Leads" and the second data object may be of the type "Company." One company may be associated with many different sales leads (e.g., one-to-many relationship), but each sales lead may be associated with only one company (e.g., one-to-one relationship).

According to one embodiment, the system may analyze a particular field in the first data object to identify the second data object. For example, the first data object of the type "sales opportunity" may include a field "company." The system may analyze the value in the field "company" to identify the name of the second data object of the object type "company." According to another example, the first data object of the type "account" may include a field "department." The system may analyze the value in the field "department" to identify the name of the second data object of the object type "department."

According to one or more embodiments, the data objects are objects stored in a database. Analyzing a field in one data object to identify another data object may include identifying in a field of a first data object the name, a pointer, a link, or other classifying information, of the second data object stored in the database.

The system identifies a second contact list associated with the second data object (Operation 220). The second contact list is different from the target contact list. According to one embodiment, the second data object includes a field that contains a link to the second contact list. For example, the field may be entitled "Contact List" and the link to the target contact list may be a uniform resource locator (URL) to a file that includes the contact list. According to an alternative embodiment, the field may include a link to a view specified by a database schema. The view specified by the database schema may indicate a defined subset of contacts associated with the second data object, from among a superset of contacts included in the database of contacts. According to one embodiment, the second data object does not include any link to the target contact list. For example, referring to the example in which the first data object is of a type "sales opportunity" and the second data object is of a type "company," the first data object may include a link to a contact list generated and/or maintained by a salesperson in the course of initiating and following-up on a sales opportunity. The second data object may include a link to a contact list maintained and/or generated by the enterprise to which the salesperson belongs. The contact list maintained by the enterprise may include a separate set of contacts. The contact list maintained by the enterprise may overlap with the contact list maintained by the salesperson. For example, a salesperson may import contacts from the second contact list into the target contact list. Similarly, the salesperson may export contacts from the target contact list into the second contact list. The contact list maintained by the enterprise may differ from the target contact list maintained by the salesperson, including: (a) one contact list having more contacts than the other, (b) one contact list having one or more unique contacts relative to the other, (c) one contact list having different contact information for the same contacts as the other. For example, in the course of following-up a sales lead, a salesperson may obtain a personal cell phone number of a contact at ABC Co. The salesperson may store the personal cell phone number in the target contact list. However, the personal cell phone number may not be stored in the second contact list. As another example, the second contact list may include contact information for a CEO of a company. The target contact list maintained by a salesperson may not include the contact information of the CEO. Instead, the target contact list may be limited to individuals identified by the salesperson as being involved in the decision-making process for a product being sold by the salesperson.

The system analyzes data in the second contact list to determine whether the contact information identified in the human-understandable text is contained in the second contact list (Operation 222). For example, the system analyze the names of the entries in the second contact list to determine whether the second contact list includes text from the human-understandable text that has been identified as a name by the semantics analysis engine. In addition, or in the alternative, the system may analyze fields associated with names of entries in the second contact list to determine whether the entries include additional contact information, such as: a job title of a contact, a phone number of a contact, an email address of a contact, a social media handle of a contact, a physical address of a contact, and a department of a contact.

If the system determines that the contact information identified in the human-understandable text is contained in the second contact list, the system applies a set of rules to determine whether to modify the target contact list to include the contact information (Operation 224). For example, one rule may specify that contact information that is (a) contained in the second contact list and (b) not contained in the target list, should be added to the target list. According to an alternative example, a rule may specify that if contact information is (a) contained in the second contact list and (b) not contained in the target list, the system should generate a notification to a user associated with the first data object to prompt the user whether to add the contact information to the target contact list.

According to another example, a rule may specify that if contact information is (a) contained in the second contact list and (b) not contained in the target list, the system should import additional contact information associated with a particular contact into the target contact list. For example, the system may identify a name and phone number (Tran, 555-122-2345) in the human-understandable text. The system may determine that the target contact list includes neither an entry associated with the name "Tran," nor an entry including the phone number 555-122-2345. The system may identify an entry associated with the name "Tran" and the phone number 555-122-2345 in the second contact list. The entry in the second contact list may also include an email address, "tran@abcco.xxx" associated with the entry for the name "Tran." The system may apply a rule to import each of the name and the phone number (which were included in the human-understandable text), as well as the email address, which was included in the second contact list but was not contained in the human-understandable text, into the target contact list.

The system applies the set of rules without human intervention. However, the set of rules may trigger prompts to receive user input. For example, the system may apply, without human intervention, the set of rules to the data contained in the second contact list to generate a prompt asking a user to indicate whether to import data from the second contact list to the target contact list.

According to one or more embodiments, modifying the target contact list includes identifying a database schema associated with the target contact list. The database schema may include the structure of contacts in the contact list, fields contained within data objects for each entry in the contact list, permissions and keys associated with the contact list, and views associated with the contact list. For example, a database may maintain a list of all contacts included in any contact list maintained by a cloud platform. The database schema may specify different subsets of contacts as different views that correspond to different users and/or data objects. One data object of a "user" type may be associated with one view of the database that includes one hundred contacts, or contact-type data objects. Another data object of a "department" type may be associated with another view of the database that includes one thousand contacts, or contact-type data objects.

If the system determines that the contact information identified in the human-understandable text is not contained in the second contact list, the system identifies a user associated with the human-understandable text (Operation 226). For example, the system may analyze the metadata associated with the human-understandable text to identify an author of the human-understandable text. According to another example, the system may analyze a value in a particular field of the first data object to identify a creator, owner, or user associated with the first data object.

The system identifies a third contact list associated with the user (Operation 228). For example, the system may identify a third data object of a type "User" with a name [UserName] (e.g., "Jay Williams," "Maria Sanchez," "Pat Jarvis," etc.). The third data object may include a field referencing the third contact list. The third contact list may be mapped to the user without being mapped to any other data objects, such as the first data object or the second data object. In other words, the first data object and the second data object may not include any field referencing the third contact list.

According to another example, the system may be a identify the third contact list by identifying a particular device associated with the user. For example, a user may enter the human-understandable text into a field displayed on a screen of a mobile device. The system may identify (a) the mobile device in which the user entered the human-understandable text, and (b) the third contact list maintained by the user in the mobile device. According to one embodiment, the system includes an application executing on the mobile device at run-time.

The system analyzes data in the third contact list to determine whether the contact information identified in the human-understandable text is contained in the third contact list (Operation 230). For example, the system analyzes the names of the entries in the third contact list to determine whether the third contact list includes text from the human-understandable text that has been identified as a name by the semantics analysis engine. In addition, or in the alternative, the system may analyze fields associated with names of entries in the third contact list to determine whether the entries include additional contact information, such as: a job title of a contact, a phone number of a contact, an email address of a contact, a social media handle of a contact, a physical address of a contact, and a department of a contact.

If the system determines that the contact information identified in the human-understandable text is contained in the third contact list, the system applies a set of rules to determine whether to modify the target contact list to include the contact information (Operation 232). For example, one rule may specify that contact information that is (a) contained in the third contact list, (b) not contained in the second contact list, and (b) not contained in the target contact list, should be added to the target contact list. According to an alternative example, a rule may specify that if contact information is (a) contained in the third contact list, (b) not contained in the second contact list, and (b) not contained in the target contact list, the system should generate a notification to a user associated with the first data object to prompt the user whether to add the contact information to the target contact list.

If the system determines that the contact information identified in the human-understandable text is not contained in the third contact list, the system modifies the target contact list to include the contact information (Operation 234). In addition, the system may further modify one or both of the second contact list and the third contact list to include the contact information.

The system may apply a set of rules to determine whether to add the contact information to the second contact list and/or the third contact list. For example, one rule may specify that contact information should be added only to the target contact list and not to the second or third contact lists. Alternatively, a rule may specify that the contact information should be added to the target contact list and the second contact list, and not to the third contact list. According to another example, a rule may specify that the contact information should be added, without user intervention, to the target contact list. The rule may further specify that the system should generate a prompt to ask a user whether to add the contact information to the second contact list.

The above-described embodiment relates to modifying one or more contact lists based on semantic content identified in human-understandable text. According to one or more embodiments, a system performs one or more application programming interface (API) defined actions based on semantic content identified in human-understandable text. For example, modifying a contact list may be one type of API-specified action. Other API-specified actions may include: generating an entry in a calendar-type application, generating an alarm in a clock-type application, generating a message or message shell in an email application or other electronic communications application, and generating a database query to retrieve data associated with the human-understandable text from a database.

For example, a system may identify in the human-understandable text the elements "email" "Victor" "re:" "update" "Project A." The system may analyze metadata associated with the human-understandable text to identify a set of API commands associated with the human-understandable text. The system may identify "generate email" as being one of the API commands. Based on determining the identified semantic content includes the API command "generate email" mapped to the text, the system may execute the API command to generate an email to a contact named "Victor." The system may populate a subject of the generated email with the content from the human-understandable text "Update for Project A."

[above example describes rule-based determination of contact list modification. One or more embodiments employ a machine learning model to generate recommendations for updating. After semantic analysis, provide convo data to ML model. ML model generates recommendation for updating one or more contact lists with data]

4. Training a Machine Learning Model

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
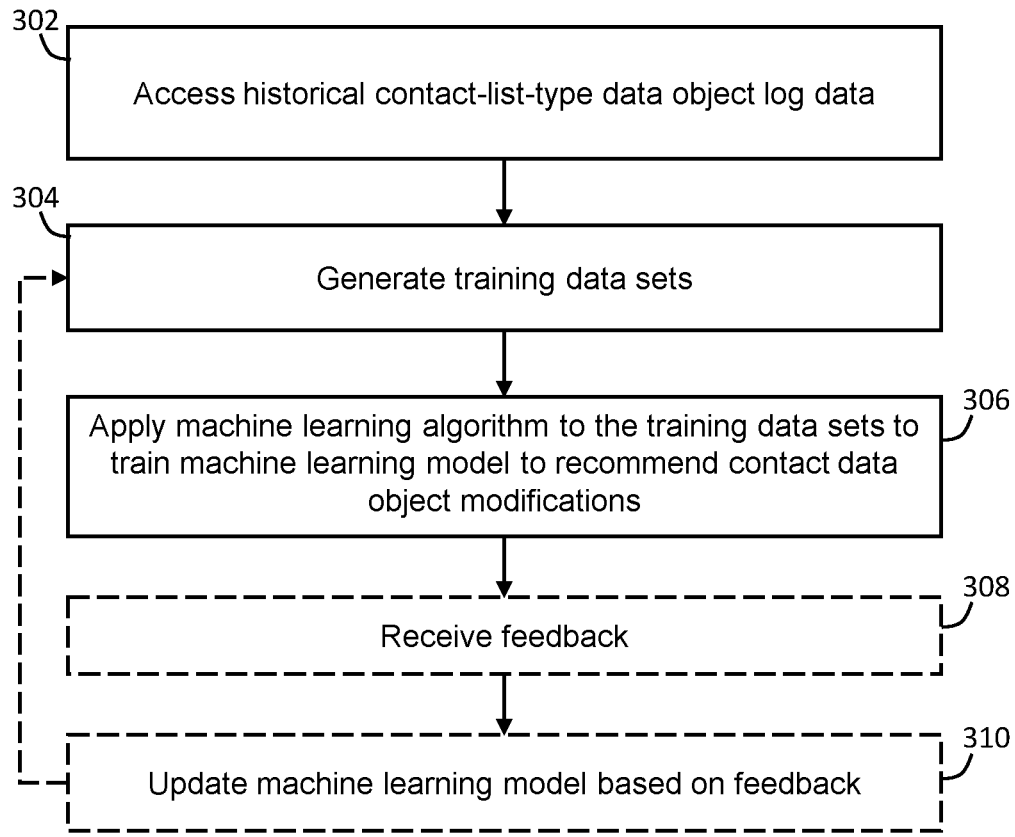
FIG. 3 illustrates an example set of operations for training a machine learning model to generate recommendations for updating datastores in accordance with one or more embodiments.

FIG. 3 illustrates an example set of operations for training a machine learning model to generate recommendations for selectively modifying multiple contact-list-type data objects with different user-access attributes. A system obtains historical contact-list-type data object log data (Operation 302). The historical log data includes information describing: (a) multiple different contact-list-type data objects, (b) attributes of the data objects including: (i) access levels associated with the data objects (i.e., which users have access to view and/or modify the data objects), and (ii) matter classification information associated with the data object (i.e., to which matters is a particular contact list associated), (b) modifications to the data objects, (c) user data associated with the modifications, and (d) matter-type classification data associated with the modifications.

Once the various data (or subsets thereof) are accessed in Operation 302, the system generates sets of training data (operation 304). Training data may include sets of (a) contact information, (b) particular contact-list-type data objects modified to include the contact information (or, in an applicable instance, an indication that no contact-list-type data objects were modified to include the contact information, (c) user attributes associated with a source (e.g., text content in which the contact information was generated) of the contact information.

The system applies a machine learning algorithm to the training data set (Operation 306). The machine learning algorithm analyzes the training data set to identify data and patterns that indicate relationships between particular sets of contact information and modifications to contact-list-type data objects. Types of machine learning models include, but are not limited to, linear regression, logistic regression, linear discriminant analysis, classification and regression trees, naïve Bayes, k-nearest neighbors, learning vector quantization, support vector machine, bagging and random forest, boosting, backpropagation, and/or clustering.

In examples of supervising ML algorithms, the system may obtain feedback on the whether a particular recommendation for modifying/not modifying one or more contact lists should be associated with a particular set of contact information (Operation 308). The feedback may affirm that a particular recommendation should be associated with the particular set of contact information. In other examples, the feedback may indicate that a particular recommendation should not be associated with the corresponding contact information. Based on the feedback, the machine learning training set may be updated, thereby improving its analytical accuracy (Operation 310). Once updated, the system may further train the machine learning model by optionally applying the model to additional training data sets.

According to one or more embodiments, a user and/or a system provide feedback to a machine learning model training engine to train the machine learning model based on a particular set of rules. For example, the particular set of rules may specify that if (a) the identified contact information is not found in a first contact-list-type data object, and (b) the identified contact information is found in a second contact-list-type data object having a particular relationship to the first contact-list-type data object, then the machine learning model should recommend modifying the first contact-list-type data object to include the contact information. The particular set of rules may further specify that if (a) the identified contact information is not found in the second contact-list-type data object, and (b) the identified contact information is found in a third contact-list-type data object having a particular relationship to the second contact-list-type data object, then the machine learning model should recommend modifying one or both of the first contact-list-type data object and the second contact-list-type data object to include the contact information. When a set of contact information includes multiple components, such as a name and a phone number, the set of rules may specify which contact-list-type data object should be modified to include one or more of the multiple components. For example, the rules may specify that one contact-list-type data object should be modified to include both a name and a phone number, while another should be modified to include only a name.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
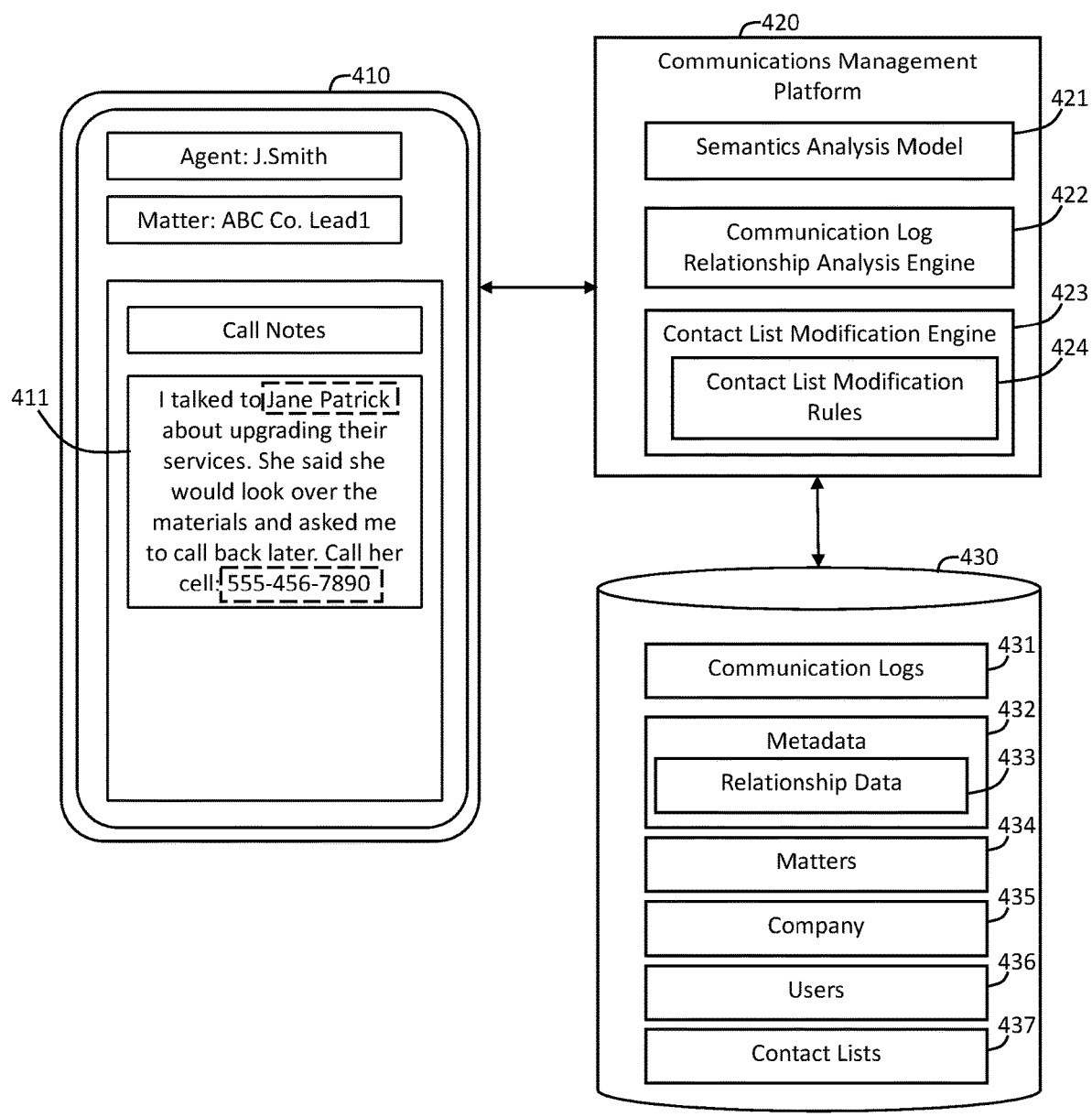
FIG. 4 illustrates an example embodiment of a computer system.

FIG. 4 illustrates a system 400 in accordance with one or more embodiments. As illustrated in FIG. 4, system 400 includes a mobile device 410, a communications management platform 420, and a data repository 430. The communications management platform 420 may be at least partially implemented within the mobile device 410. According to one embodiment, the mobile device 410 includes an application including at least the semantics analysis model 421 and the communication log relationship analysis engine 422 of the communications management platform 420. According to another environment, the communications management platform 420 is implemented at least in part in a cloud environment. The mobile device 410 may communicate with the communications management platform 420 via a network.

The mobile device 410 executes an application that allows a user to generate text content 411. For example, a user may select an interface element, "call notes," to enter text describing a call. In the example illustrated in FIG. 3, the user generates text describing a conversation with "Jane Patrick." The communications management platform 420 includes a semantics analysis model 421. The semantics analysis model 421 analyzes the text content 411 to identify parts of speech and contact information. The semantics analysis model 421 identifies a proper name "Jane Patrick" and a phone number "555-456-7890" in the text content 411.

The communication log relationship analysis engine 422 analyzes metadata 432 associated with the text content 411 in the communication log 431 stored in the data repository 430. The communication log relationship analysis engine 422 identifies, in the metadata 432, relationship data 433 specifying a relationship between (a) the text content 411 and (b) a first data object of a first object type. For example, the first object type may be a "matter" object type 434. A plurality of matter-type objects 434 may be stored in the data repository 430. In the example illustrated in FIG. 4, the matter-type data object may be named "ABC Co. Lead1." The communication log relationship analysis engine 422 further identifies a relationship between the first data object and a target contact list among a set of contact lists 437. For example, the communication log relationship analysis engine 422 may analyze a database schema associated with a database including the contact lists 437 to identify the target contact list among the contact lists 436.

The contact list modification engine 423 determines whether the target contact list includes the contact information. For example, the contact list modification engine 423 may determine whether the target contact list includes an entry with a name "Jane Patrick." In addition, or in the alternative, the contact list modification engine 423 may determine whether the contact list includes any entry with a phone number 555-456-7890. In addition, or in the alternative, the contact list modification engine 423 may determine whether the contact list includes an entry with a name "Jane Patrick" and with a phone number 555-456-7890.

Based on determining that the target contact list does not include the contact information, including the name "Jane Patrick," the contact list modification engine 423 applies a list of rules 424 to determine whether to modify the target contact list to include the contact information. One rule may specify that (a) if the target contact list does not include an entry including (b) a name (c) generated by a particular user, then the contact list modification engine 423 should generate in the target contact list a new entry with the specified name (i.e., "Jane Patrick). The rule may further specify that if the same text includes a phone number determined to be associated with the name, the modification engine 423 should populate a "phone" field of the contact list entry with the identified phone number (i.e., "555-456-7890").

In addition, or in the alternative, the rules 424 may specify operations to analyze one or more additional contact lists prior to determining whether to modify the target contact list.

According to the example embodiment illustrated in FIG. 4, a rule 424 directs the contact list modification engine 423 to identify a second data object associated with the identified matter 434. The second data object is of a type "company" 435. The particular second data object of FIG. 4 may be an object "ABC Co." The object ABC Co. may be associated with many different objects of the object type "matter." However, each matter-type object 434 may be associated with only one company-type data object 435. The set of rules 424 directs the contact list modification engine 423 to identify a second contact list, among the contact lists 437, associated with the second data object "ABC Co." of the type "company" 435.

The contact list modification engine 423 determines whether the second contact list includes the contact information. For example, the contact list modification engine 423 may determine whether the second contact list includes an entry with a name "Jane Patrick." In addition, or in the alternative, the contact list modification engine 423 may determine whether the second contact list includes any entry with a phone number 555-456-7890. In addition, or in the alternative, the contact list modification engine 423 may determine whether the second contact list includes an entry with a name "Jane Patrick" and with a phone number 555-456-7890.

Based on determining that the second contact list does not include the contact information, including the name "Jane Patrick," the contact list modification engine 423 applies the list of rules 424 to determine whether to modify one or both of the target contact list and the second contact list to include the contact information. One rule may specify that (a) if neither the target contact list nor the second contact list includes an entry including a name identified in the text content 411, then the contact list modification engine 423 should generate in the target contact list a new entry with the specified name (i.e., "Jane Patrick). The rule may further direct the contact list modification engine 423 to generate a new entry with the specified name, "Jane Patrick," in the second contact list.

In addition, or in the alternative, the rules 424 may specify operations to analyze one or more additional contact lists prior to determining whether to modify the target contact list and/or the second contact list.

According to the example embodiment illustrated in FIG. 4, a rule 424 directs the contact list modification engine 423 to identify a third data object, of a type "User" 436, associated with the author "J.Smith" of the text content 411 and with the matter "ABC Co. Lead 1." The set of rules 424 directs the contact list modification engine 423 to identify a third contact list, among the contact lists 437, associated with the third data object "J.Smith." of the type "User" 436. For example, a rule may direct the contact list modification engine 423 to identify a particular field in the third data object "J.Smith" containing a link to a third contact list. The third contact list may be independent of the first and second data objects. In other words, the data object "ABC Co. Lead1" may not include any reference to the third contact list. Similarly, the data object "ABC Co." may not include any reference to the third contact list. The third contact list is a list of contacts maintained by the user, J. Smith, independently of any matters. In one example embodiment, the third contact list is a "Quick Contacts" list of the most frequently-accessed contacts of the user J. Smith.

Based on determining that the third contact list does not include the contact information, including the name "Jane Patrick," the contact list modification engine 423 applies the set of rules 424 to determine whether to modify one or both of the target contact list and the second contact list to include the contact information. One rule may specify that (a) if none of the target contact list, the second contact list, and the third contact list includes an entry including a name identified in the text content 411, then the contact list modification engine 423 should generate in the target contact list a new entry with the specified name (i.e., "Jane Patrick). The rule may further direct the contact list modification engine 423 to generate a new entry with the specified name, "Jane Patrick," in the second contact list.

In one or more embodiments, a data repository 430 is any type of storage unit and/or device (e.g., a file system, database, collection of tables, or any other storage mechanism) for storing data. Further, a data repository 430 may include multiple different storage units and/or devices. The multiple different storage units and/or devices may or may not be of the same type or located at the same physical site. Further, a data repository 430 may be implemented or may execute on the same computing system as the communications management platform 420 and/or the mobile device 410. Alternatively, or additionally, a data repository 430 may be implemented or executed on a computing system separate from the communications management platform 420 and/or the mobile device 410. A data repository 430 may be communicatively coupled to the communications management platform 420 and/or the mobile device 410 via a direct connection or via a network.

Information describing communication logs 431, metadata 432, data objects 434-236, and contact lists 437 may be implemented across any of components within the system 400. However, this information is illustrated within the data repository 430 for purposes of clarity and explanation.

In one or more embodiments, a communications management platform 420 refers to hardware and/or software configured to perform operations described herein for analyzing text content and triggering one or more system actions based on the text content.

In an embodiment, the communications management platform 420 is implemented on one or more digital devices. The term "digital device" refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein for analyzing text content and modifying contact-list-type data objects are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
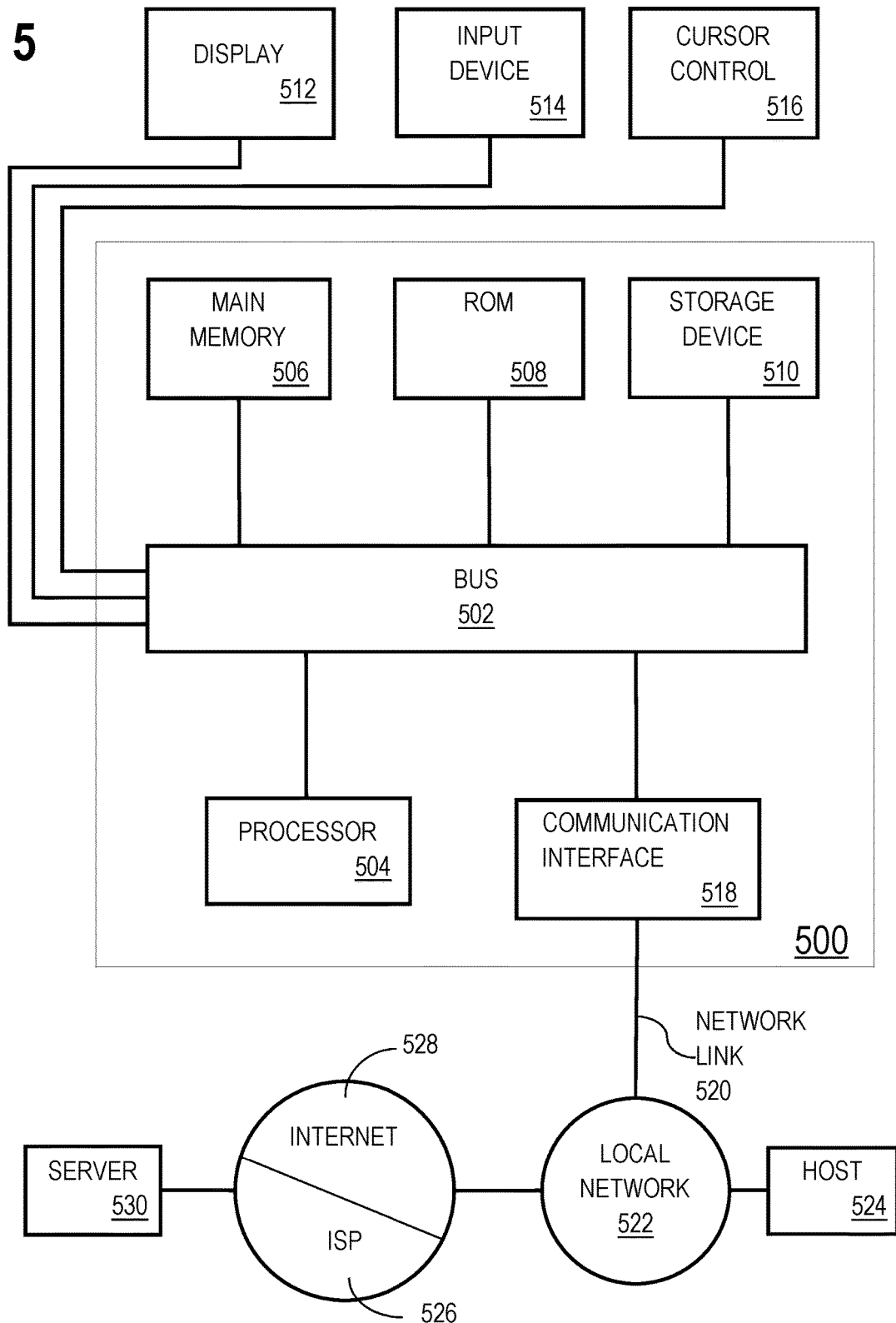
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
- training a machine learning model to generate a recommendation to update a target contact list based on contact information comprised in a set of human-understandable text, the training comprising:
  - obtaining training data sets, each training data set of historical data comprising:
    - historical contact information;
    - historical metadata associated with the historical contact information; and
    - a historical modification to a historical contact list based on the historical contact information and/or the historical metadata; and
  - training the machine learning model based on the training data sets;
- obtaining the set of human-understandable text;
- applying a semantic analysis engine to the human-understandable text to identify the contact information comprised in the set of human-understandable text;
- at runtime: selecting the target contact list, of a plurality of contact lists, to be updated based on the contact information in the set of human-understandable text, the selecting operation comprising:
  - analyzing metadata corresponding to the human-understandable text to determine that the human-understandable text is mapped to a first data object of a first type;
  - identifying a relationship between the first data object and the target contact list; and
  - selecting the target contact list based on the relationship between the first data object and the target contact list;
- identifying a database schema associated with the target contact list;
- applying the machine learning model to the contact information to generate a particular recommendation for modifying at least the target contact list;
- based at least in part on the particular recommendation, generating a first operation to update the target contact list based on the contact information comprised in the set of human-understandable text and the database schema associated with the target contact list; and
- executing the first operation to update the target contact list.

2. The one or more non-transitory computer readable media of claim 1, wherein the target contact list comprises a plurality of database records, and wherein the first operation comprises:
- creating a new database record, in accordance with the database schema, based on the contact information comprised in the set of human-understandable text; and
- executing a second operation to add the new database record to the plurality of database records comprised in the target contact list.

3. The one or more non-transitory computer readable media of claim 2, wherein the operations further comprise determining that the target contact list does not include any record corresponding to the contact information comprised in the human-understandable text, and
wherein the generating and executing the first operation is responsive to determining that the target contact list does not include any record corresponding to the contact information comprised in the human-understandable text.

4. The one or more non-transitory computer readable media of claim 3, wherein the contact information is at least one of:
- a phone number;
- an email address;
- a job title; and
- a company name associated with a person, and
wherein determining that the target contact list does not include any record corresponding to the contact information comprised in the human-understandable text includes:
- identifying a relationship between the contact information and a name included in the target contact list;
- identifying, using the database schema, a particular field associated with the contact information, and
- determining that the particular field in a database record corresponding to the name does not include the contact information.

5. The one or more non-transitory computer readable media of claim 2, wherein the first operation is executed in response to receiving user input selecting the first operation for execution.

6. The one or more non-transitory computer readable media of claim 1, wherein the operations further comprise:
- determining that the first data object of the first type is mapped to a second data object of a second type;
- identifying a relationship between the second data object and a second contact list; and
- determining that (a) the target contact list does not include any record corresponding to the contact information comprised in the human-understandable text, and (b) the second contact list does not include any record corresponding to the contact information comprised in the human-understandable text,
wherein the determining that the first data object is mapped to the second data object is performed responsive to determining that the target contact list does not include any record corresponding to the contact information comprised in the human-understandable text.

7. The one or more non-transitory computer readable media of claim 6, wherein the second data object is mapped to a plurality of data objects of the first type, and wherein the first data object is mapped to only a single data object of the second type.

8. The one or more non-transitory computer readable media of claim 1, wherein the operations further comprise:
- determining (a) that the first data object of the first type is mapped to a second data object of a second type, and (b) that the human-understandable text is associated with a user;
- identifying a relationship between the second data object and a second contact list;
- identifying a relationship between the user and a third contact list, wherein the third contact list is not mapped to the first data object, and wherein the third contact list is not mapped to the second data object; and determining that (a) the target contact list does not include any record corresponding to the contact information comprised in the human-understandable text, (b) the second contact list does not include any record corresponding to the contact information comprised in the human-understandable text, and (c) the third contact list does not include any record corresponding to the contact information comprised in the human-understandable text, wherein the determining that the first data object is mapped to the second data object is performed responsive to determining that the target contact list does not include any record corresponding to the contact information comprised in the human-understandable text, and wherein the determining that the third contact list is associated with the user is performed responsive to determining that the second contact list does not include any record corresponding to the contact information comprised in the human-understandable text.

9. A method comprising:

training a machine learning model to generate a recommendation to update a target contact list based on contact information comprised in a set of human-understandable text, the training comprising:
  obtaining training data sets, each training data set of historical data comprising:
    historical contact information;
    historical metadata associated with the historical contact information; and
    a historical modification to a historical contact list based on the historical contact information and/or the historical metadata; and
  training the machine learning model based on the training data sets;

obtaining the set of human-understandable text;

applying a semantic analysis engine to the human-understandable text to identify the contact information comprised in the set of human-understandable text;

at runtime: selecting the target contact list, of a plurality of contact lists, to be updated based on the contact information in the set of human-understandable text, the selecting operation comprising:
  analyzing metadata corresponding to the human-understandable text to determine that the human-understandable text is mapped to a first data object of a first type;
  identifying a relationship between the first data object and the target contact list; and
  selecting the target contact list based on the relationship between the first data object and the target contact list;

identifying a database schema associated with the target contact list;

applying the machine learning model to the contact information to generate a particular recommendation for modifying at least the target contact list;

based at least in part on the particular recommendation, generating a first operation to update the target contact list based on the contact information comprised in the set of human-understandable text and the database schema associated with the target contact list; and executing the first operation to update the target contact list.

10. The method of claim 9, wherein the target contact list comprises a plurality of database records, and wherein the first operation comprises:

creating a new database record, in accordance with the database schema, based on the contact information comprised in the set of human-understandable text; and executing a second operation to add the new database record to the plurality of database records comprised in the target contact list.

11. The method of claim 10, further comprising determining that the target contact list does not include any record corresponding to the contact information comprised in the human-understandable text, and wherein the generating and executing the first operation is responsive to determining that the target contact list does not include any record corresponding to the contact information comprised in the human-understandable text.

12. The method of claim 11, wherein the contact information is at least one of:
  a phone number;
  an email address;
  a job title; and
  a company name associated with a person, and wherein determining that the target contact list does not include any record corresponding to the contact information comprised in the human-understandable text includes:
  identifying a relationship between the contact information and a name included in the target contact list;
  identifying, using the database schema, a particular field associated with the contact information, and
  determining that the particular field in a database record corresponding to the name does not include the contact information.

13. The method of claim 10, wherein the first operation is executed in response to receiving user input selecting the first operation for execution.

14. The method of claim 9, further comprising:
  determining that the first data object of the first type is mapped to a second data object of a second type;
  identifying a relationship between the second data object and a second contact list; and
  determining that (a) the target contact list does not include any record corresponding to the contact information comprised in the human-understandable text, and (b) the second contact list does not include any record corresponding to the contact information comprised in the human-understandable text, wherein the determining that the first data object is mapped to the second data object is performed responsive to determining that the target contact list does not include any record corresponding to the contact information comprised in the human-understandable text.

15. The method of claim 14, wherein the second data object is mapped to a plurality of data objects of the first type, and wherein the first data object is mapped to only a single data object of the second type.

16. The method of claim 9, further comprising:
  determining (a) that the first data object of the first type is mapped to a second data object of a second type, and (b) that the human-understandable text is associated with a user;
  identifying a relationship between the second data object and a second contact list;
  identifying a relationship between the user and a third contact list, wherein the third contact list is not mapped to the first data object, and wherein the third contact list is not mapped to the second data object; and determining that (a) the target contact list does not include any record corresponding to the contact information comprised in the human-understandable text, (b) the second contact list does not include any record corresponding to the contact information comprised in the human-understandable text, and (c) the third contact list does not include any record corresponding to the contact information comprised in the human-understandable text, wherein the determining that the first data object is mapped to the second data object is performed responsive to determining that the target contact list does not include any record corresponding to the contact information comprised in the human-understandable text, and wherein the determining that the third contact list is associated with the user is performed responsive to determining that the second contact list does not include any record corresponding to the contact information comprised in the human-understandable text.

17. A system comprising:
one or more processors; and
memory storing instructions that, when executed by the one or more processors, cause the system to perform operations comprising:
training a machine learning model to generate a recommendation to update a target contact list based on contact information comprised in a set of human-understandable text, the training comprising:
obtaining training data sets, each training data set of historical data comprising:
historical contact information;
historical metadata associated with the historical contact information; and
a historical modification to a historical contact list based on the historical contact information and/or the historical metadata; and
training the machine learning model based on the training data sets;
obtaining the set of human-understandable text;
applying a semantic analysis engine to the human-understandable text to identify the contact information comprised in the set of human-understandable text;
at runtime: selecting the target contact list, of a plurality of contact lists, to be updated based on the contact information in the set of human-understandable text, the selecting operation comprising:
analyzing metadata corresponding to the human-understandable text to determine that the human-understandable text is mapped to a first data object of a first type;
identifying a relationship between the first data object and the target contact list; and
selecting the target contact list based on the relationship between the first data object and the target contact list;
identifying a database schema associated with the target contact list;
applying the machine learning model to the contact information to generate a particular recommendation for modifying at least the target contact list;
based at least in part on the particular recommendation, generating a first operation to update the target contact list based on the contact information comprised in the set of human-understandable text and the database schema associated with the target contact list; and
executing the operation to update the target contact list.

18. One or more non-transitory computer readable media comprising instructions which, when executed by one or more hardware processors, causes performance of operations comprising:
obtaining a set of human-understandable text;
applying a semantic analysis engine to the human-understandable text to identify contact information comprised in the set of human-understandable text;
at runtime: selecting a target contact list, of a plurality of contact lists, to be updated based on the contact information in the set of human-understandable text, the selecting operation comprising:
analyzing metadata corresponding to the human-understandable text to determine that the human-understandable text is mapped to a first data object of a first type;
identifying a relationship between the first data object and the target contact list; and
selecting the target contact list based on the relationship between the first data object and the target contact list;
identifying a database schema associated with the target contact list;
generating an operation to update the target contact list based on the contact information comprised in the set of human-understandable text and the database schema associated with the target contact list; and
executing the operation to update the target contact list,
wherein selecting the target contact list to be updated further comprises:
determining that the first data object of the first type is mapped to a second data object of a second type;
identifying a relationship between the second data object and a second contact list; and
determining that (a) the target contact list does not include any record corresponding to the contact information comprised in the human-understandable text, and (b) the second contact list does not include any record corresponding to the contact information comprised in the human-understandable text,
wherein the determining that the first data object is mapped to the second data object is performed responsive to determining that the target contact list does not include any record corresponding to the contact information comprised in the human-understandable text.

19. One or more non-transitory computer readable media comprising instructions which, when executed by one or more hardware processors, causes performance of operations comprising:
obtaining a set of human-understandable text;
applying a semantic analysis engine to the human-understandable text to identify contact information comprised in the set of human-understandable text;
at runtime: selecting a target contact list, of a plurality of contact lists, to be updated based on the contact information in the set of human-understandable text, the selecting operation comprising:
analyzing metadata corresponding to the human-understandable text to determine that the human-understandable text is mapped to a first data object of a first type;
identifying a relationship between the first data object and the target contact list; and
selecting the target contact list based on the relationship between the first data object and the target contact list;

identifying a database schema associated with the target contact list;

generating an operation to update the target contact list based on the contact information comprised in the set of human-understandable text and the database schema associated with the target contact list; and executing the operation to update the target contact list, wherein selecting the target contact list to be updated further comprises:

determining (a) that the first data object of the first type is mapped to a second data object of a second type, and (b) that the human-understandable text is associated with a user;

identifying a relationship between the second data object and a second contact list;

identifying a relationship between the user and a third contact list, wherein the third contact list is not mapped to the first data object, and wherein the third contact list is not mapped to the second data object; and determining that (a) the target contact list does not include any record corresponding to the contact information comprised in the human-understandable text, (b) the second contact list does not include any record corresponding to the contact information comprised in the human-understandable text, and (c) the third contact list does not include any record corresponding to the contact information comprised in the human-understandable text, wherein the determining that the first data object is mapped to the second data object is performed responsive to determining that the target contact list does not include any record corresponding to the contact information comprised in the human-understandable text, and wherein the determining that the third contact list is associated with the user is performed responsive to determining that the second contact list does not include any record corresponding to the contact information comprised in the human-understandable text.

\* \* \* \* \*